Figure 1:
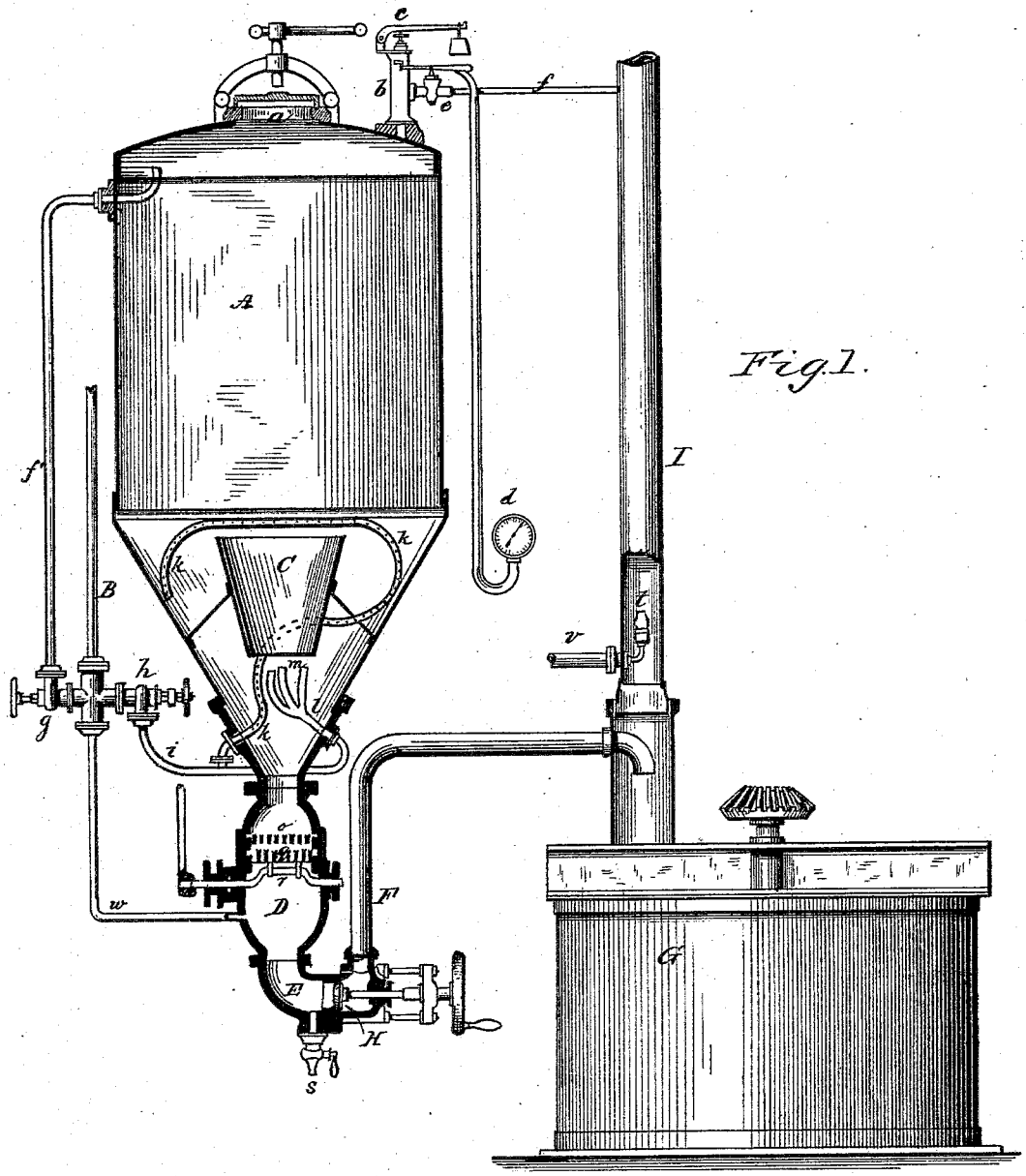

(No Model.) 2 Sheets—Sheet 1.

C. UNGER.
APPARATUS FOR PREPARING VEGETABLE SUBSTANCES FOR FERMENTATION.

No. 296,651. Patented Apr. 8, 1884.

Attest
J. W. Reynolds
T. J. Patterson

Charles Unger Inventor
Connolly Bros & McTighe
Attorneys.

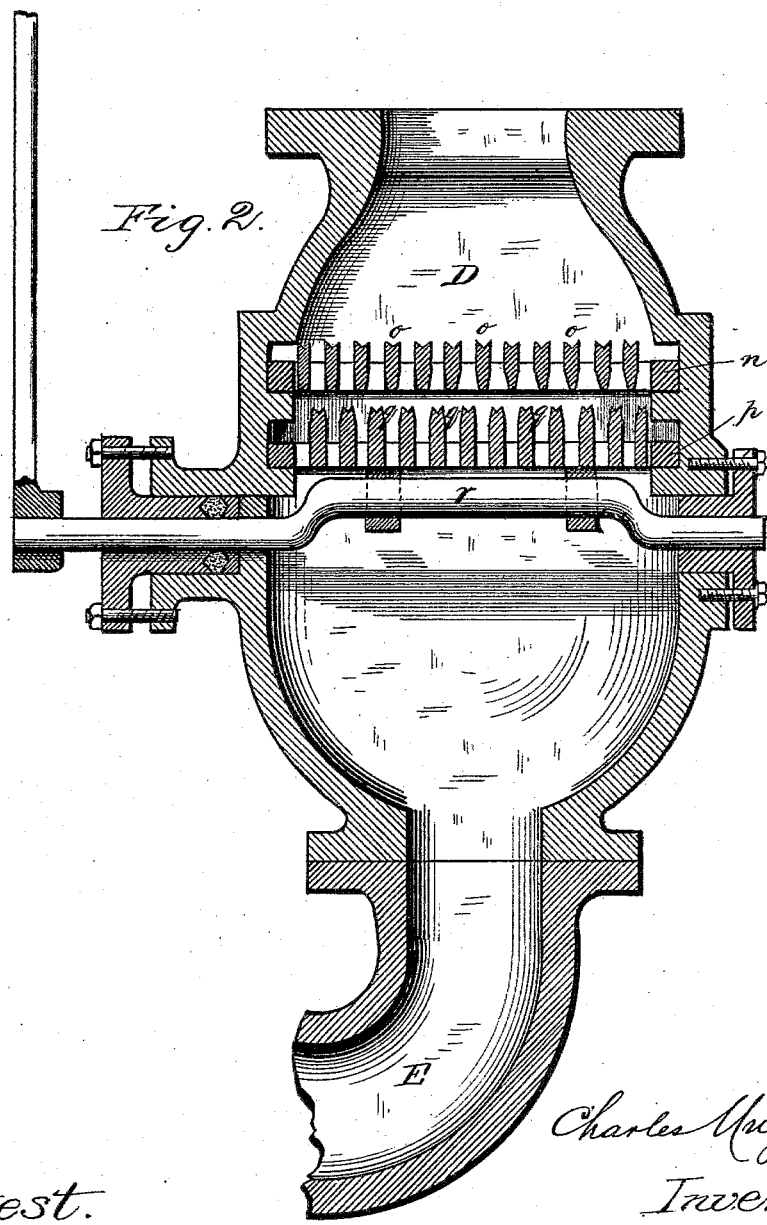

UNITED STATES PATENT OFFICE.

CHARLES UNGER, OF PITTSBURG, PENNSYLVANIA.

APPARATUS FOR PREPARING VEGETABLE SUBSTANCES FOR FERMENTATION.

SPECIFICATION forming part of Letters Patent No. 296,651, dated April 8, 1884.

Application filed October 31, 1883. (No model.)

*To all whom it may concern:*

Be it known that I, CHARLES UNGER, of Pittsburg, in the county of Allegheny and State of Pennsylvania, have invented certain new and useful Improvements in Apparatus for Preparing Vegetable Substances for Fermentation; and I do hereby declare that the following is a full, clear, and exact description of the invention, which will enable others skilled in the art to which it appertains to make and use the same, reference being had to the accompanying drawings, which form a part of this specification, in which—

Figure 1 is a vertical section of my apparatus. Fig. 2 is a similar view, enlarged, of the drum containing the chopping devices.

The object of this invention is to effect a simple and thorough mashing or disintegration of grain or vegetables in the process of mashing for distillation purposes, and to properly soften the same, preparatory to its introduction into the mash-tub or fermenting-vat.

The invention consists in subjecting the material under treatment to the softening influence of live steam, and then utilizing direct steam-pressure to drive it against a series of cutters, whereby the material is at once reduced to pulp; and the invention further consists in the various steps and in the construction and combination of devices, substantially as hereinafter fully described and claimed.

I construct the apparatus as follows: A designates what may be termed the "boiler"—a vessel substantially constructed to withstand a sufficient steam-pressure. It has a man-hole or opening, $a$, at the top for the introduction of the grain or vegetables to be crushed or reduced to pulp. From the top leads a pipe, $b$, having safety-valve $c$, steam-gage $d$, regulating-cock $e$, and waste-pipe $f$, as shown, all which devices are for the purposes of safety and adjustment of the pressure in the boiler A.

B is the main steam-pipe coming from the steam source, and communicates with the boiler or vessel A, at or near the top of the latter, by the pipe $f'$, which has the valve $g$, as shown. Pipe B also communicates through valve $h$ with a pipe, $i$, which delivers steam to the pipes $k$ and $l$. Pipe $k$ passes one or more times around the conical bottom of vessel A inside, and is perforated, as shown, and pipe $l$, after passing into vessel A, spreads out in the fork $m$, forming a multiplex nozzle, as shown.

In the conical or tapering lower end of boiler A is fixed by suitable stays a funnel-shaped tube, C, whose function will be described hereinafter.

To the bottom of boiler A is attached the drum D, communicating with the boiler A.

About the center of drum D, I fix a frame, $n$, having the horizontal knives or bars $o$, whose upper edges are sharpened and whose sides taper downwardly, as shown. Below this is a vertically-movable frame, $p$, having the horizontal bars $q$, whose upper edges are sharpened, and whose sides taper upwardly, said bars $q$ or knives being so placed as to register with the spaces between the upper series of knives or bars, $o$.

A crank, $r$, is let into suitable stuffing-boxes in the sides of drum D, and is connected to the frame $p$, so that by rotating the crank $r$ the frame $p$, and with it the bars $q$, can be elevated or lowered. Fig. 2 shows the bars $q$ in their lowest position. They may be elevated until their tapered sides meet the tapered sides of the bars $o$, in which case all outlet through the drum D will be closed.

To drum D an elbow, E, is attached, and provided at its bottom with a blow-off or cleaning cock, $s$, as shown. Elbow E connects with the discharge-pipe F, which in turn leads the material to a mash-tub, G.

At the mouth of elbow E is a throttle-valve, H, interposed between it and the discharge-pipe F.

At the delivery end of pipe F, or in the waste-pipe or chimney I, into which the latter delivers its charge, to fall into the tub G, I locate a steam-ejector, $t$, supplied with steam by pipe $v$, as shown.

The operation is as follows: I first close the throttle-valve H and rotate the crank $r$ until the lower series of knives, $q$, enter and close the spaces between knives $o$. I then admit water to the boiler A, in about the proportion of twenty-two wine-gallons to every one hundred pounds of grain or vegetables to be treated. The water is then heated to about boiling-point by admitting steam through pipes $i$ and $k$. The grain or vegetables is then introduced into boiler A through opening $a$, and the latter then closed tightly. The steam is then let into the mass under a considerable pressure—say forty pounds per square inch—through the pipes $i$ and $k$, for about two hours and a half, or whatever time is necessary. During this time the cock $e$ is opened slightly, to assist the circulation of steam, which then, with the aid of the funnel-shaped tube C, sets the whole mass in motion, and maintains it as long as the steam-pressure is on through pipes $i$ and $k$. The result is that the grain or vegetables is thoroughly softened and brought to the condition required for the succeeding operations. At the end of the above-stated period steam is shut off from the pipes $i$ and $k$. Cock $e$ is closed. Then valve $g$ is opened, and the cutting devices set for operation by lowering the frame $p$ and knives $q$ slightly, in which position they are allowed to remain until the crushing or cutting process is completed. The steam under pressure entering boiler A by pipe $f'$ at the top effects a downward pressure on the mass in the boiler A, and the mass is driven forcibly downward against the cutters $o$ and $q$, which have the effect of chopping the grain or vegetables thoroughly and reducing it to a pulpy mass. At the same time that steam is admitted by pipe $f'$ the throttle-valve H is opened and the now chopped and pulpy mass is driven by the pressure into pipe F toward the mash-tub G. In this transmission the motion is assisted by the ejector $t$, which not only helps the movement but also serves to keep the mash-tub cool enough to prevent the prepared malt therein from being burned or spoiled by the overheated mash from boiler A.

The adjustability of the frame $p$ and knives $q$ allows of regulation to adapt the cutting or chopping devices to the kind of grain or vegetables desired to be treated. Should they become clogged or obstructed, steam is admitted by pipe $w$ (which branches from the main pipe) under the cutters, and, by opening the cock $c$, the steam blows upwardly and immediately clears out the obstruction.

The process and operation of devices is very simple, and the crushing or chopping and reduction of the material is brought about in a very rapid manner and at little cost.

In practice the cutters first act to chop the material, and then the close proximity of their sides acts to cause the material to be crushed or squeezed in forcibly passing between them.

I am aware that it is not new to prepare grain, &c., for mash by boiling or softening in closed vessels under the pressure of steam, and then reducing to pulp by chopping or crushing; and I do not therefore claim that process as my own invention.

What I claim as new is—

1. In an apparatus for preparing vegetable matter for fermentation, the combination, with boiler A, adapted to receive steam under pressure at its upper end, of a drum, D, communicating with the lower end thereof, and having one or more horizontal series of vertically-reciprocating sharpened cutters, substantially as described.

2. In combination with drum D, the series of stationary cutters $o$, having downwardly-tapered sides, and the vertically-movable series of sharpened cutters $q$, having upwardly-tapered sides, substantially as described.

3. The combination, in drum D, of the stationary cutters $o$, the vertically-movable cutters $q$, registering with the spaces between said cutters $o$, and means for moving said cutters $q$ from outside the drum, substantially as described.

In testimony that I claim the foregoing as my own I have hereto affixed my signature in presence of two witnesses.

CHARLES UNGER.

Witnesses:
 THOS. MILLER,
 ELIAS KANFFELD.